Sept. 1, 1964  T. C. McGOW ETAL  3,146,876

MECHANICAL SELECTION DEVICE FOR CONVEYORS

Filed Nov. 20, 1961  2 Sheets-Sheet 1

INVENTORS
THOMAS C. McGOW
ROBERT W. GOTHAM
DONALD A. SCHNEIDER
BY

ATTORNEYS

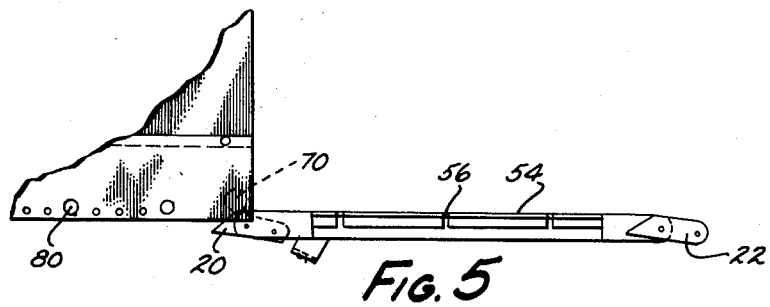
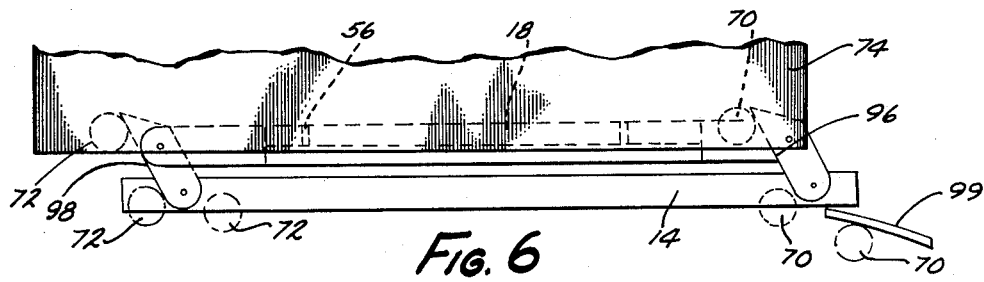
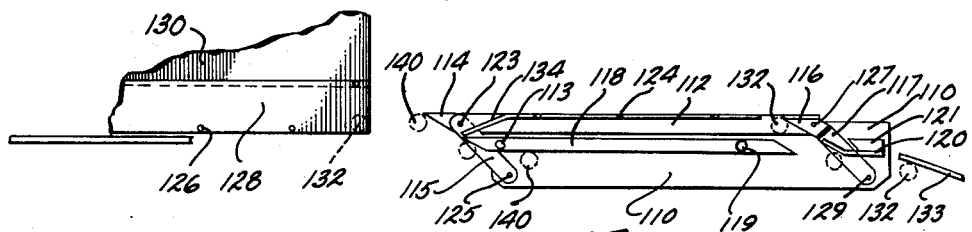
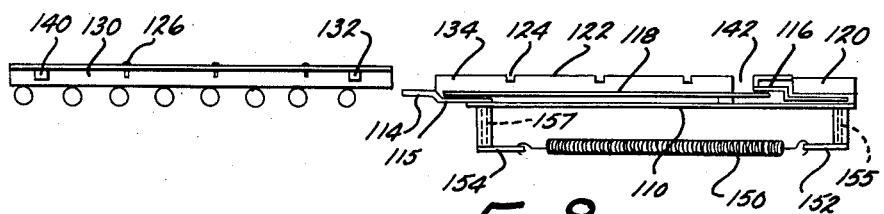
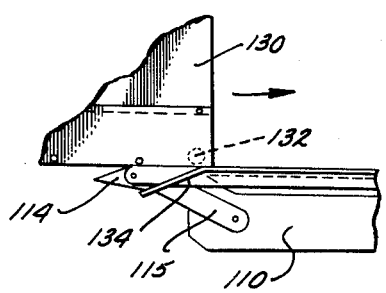

United States Patent Office 3,146,876
Patented Sept. 1, 1964

3,146,876
MECHANICAL SELECTION DEVICE FOR CONVEYORS
Thomas C. McGow, Summit, and Robert W. Gotham, Plainfield, N.J., and Donald A. Schneider, Ada Township, Kent County, Mich., assignors to The Rapids-Standard Company, Inc., Grand Rapids, Mich., a corporation of Michigan
Filed Nov. 20, 1961, Ser. No. 153,602
2 Claims. (Cl. 198—38)

This invention relates to conveyors, and more particularly to a mechanism for reading preset codes on passing carriers and causing a reaction to occur in respect to a carrier selected from the other carriers to divert the carrier from the conveyor on which it is traveling.

This is a co-pending application of application Serial No. 100,085, filed April 3, 1961, entitled Mechanical Selection for Conveyors, and assigned to the assignee herein.

Preselection and carrier diverting mechanisms of the prior art range from the very simple to the very complex. The simple devices characteristically effect only elementary selection operations, and further are adaptable only to certain types of conveyors. Their use is thus very limited. In high speed manufacturing, automated warehousing, and other industries where elaborate conveying and routing systems are so important, highly complex preselection and diverting mechanisms are therefore presently necessarily adopted. These may involve a reader having a series of independently reciprocable pins which, when properly actuated, close a series of electrical switches to activate an independent diverting electrical solenoid system; or may involve a carefully arranged and delicate magnetic coding and reading apparatus to actuate an electrical control network for a diverter; or may involve a series of delicate tripping arms, stopping devices, and clutching mechanisms; or may involve any number of other complex systems on the market today.

Users of automated conveyor systems, therefore, must either purchase very elaborate, expensive, and complicated preselection and diverting mechanisms, or must supplement the simple and functionally limited type with manual labor due to the present lack of a combined selection and diverter mechanism which possesses in combination the several attributes of (1) simplicity, (2) reliability, (3) operational versatility for adaptation to different types of conveyed articles, and/or different types of conveyors, including powered and gravity types and including overhead and floor types, (4) flexibility of attachment to allow quick, simple relocation of the selector and diverter on the conveyor, and (5) operational smoothness.

Due to the greatly increased use of automation in recent years, the need has become urgent for a conveyor selection and diverting mechanism within which could be compatably combined all of these features. Such a conveyor must be flexible and capable of quick performance. It must also be characterized by simplicity to eliminate the cost of failures and frequent maintenance.

In the prior art devices, not only are the preselection and diverter mechanisms limited and usually complex and expensive, but also the selector generally acts only as a trip for separate interception and rerouting devices, clutching mechanisms, or independently powered diverters such as electrical solenoids and the like. These auxiliary devices are space consuming, require extra maintenance, and frequently are costly. Sometimes they are delicate and thus normally adaptable only to lightweight carriers and loads.

Various prior art diverters for heavier carriers and pallets involve the use of large deflector or sweep-off arms which are triggered to swing across the entire conveyor track and latch on the opposite side for intercepting the carrier path and diverting the carrier. Such devices are undesirable in many instances due to the time required to swing completely across the track and the power requirements for swinging the arm across the track. Their size and inertia often result in extended operating cycles causing interference of the arm with following carriers. They are generally bulky and have excessive space requirements. These devices also have other disadvantages.

It is often desirable to use a carrier path-interceptor-type diverter which avoids these drawbacks. It is preferable that it form a part of the selector apparatus itself and effect its interception by movement across only a small portion of the carrier path. It should complete the interception and diversion of individual carriers, quickly, smoothly and automatically, and then rapidly return to its normal reading and selecting position.

The code means utilized on such a device should be easily and quickly rearranged and have a large number of code combinations and a wide range of applications. This is especially true where the device is to completely replace the present complex electrical switching and magnetic coding systems.

It is, therefore, the object of this invention, among others, to provide a combined mechanical selection and diverting device for conveyors which possesses all of these characteristics. It provides such a device which is both simple and inexpensive. It is adaptable to a wide range of conveyors including both powered and gravity, and both overhead and floor types. It is capable of causing the carrier to be removed from the conveyor without auxiliary power equipment. It uses no delicate tripping levers, stopping mechanisms, or troublesome auxiliary clutches. It gradually and continuously diverts the passing carrier without stopping it or substantially reducing its speed. It simplifies diverter construction to a marked degree and costs only a fraction of that of conventional devices having a much more limited application. It efficiently and effectively selects a particular carrier and quickly intercepts a small portion of the path thereof to smoothly divert and guide it laterally from the conveyor. After sweeping the carrier off, it quickly and automatically returns to its normal selecting position to read the codes of subsequent carriers.

The objects of this invention also include a structure of compact construction capable of rapid and simple relocation along the conveyor. It provides a self-contained or packaged unit requiring little or no reworking of the conveyor for either installation or removal. Despite the simplicity and low cost, this invention provides a selection system capable of a wide range of possible coding and selection variations. The code is further capable of quick and simple resetting.

These and other objects will be apparent to those in the art upon studying the following specification in conjunction with the drawings, in which:

FIG. 5 is a fragmentary plan view depicting the apparatus illustrated in FIG. 1 as depressed by a passing carrier;

FIG. 6 is a fragmentary plan view of the apparatus illustrated in FIG. 1 after the selection of a carrier and as it initiates diversion of it;

FIG. 7 is a fragmentary plan view of a modified form of the invention;

FIG. 8 is an elevational view of the modified selection apparatus and carrier illustrated in FIG. 7; and FIG. 9 is a fragmentary plan view of the apparatus in FIG. 7 as depressed by a passing carrier.

Figure 1:
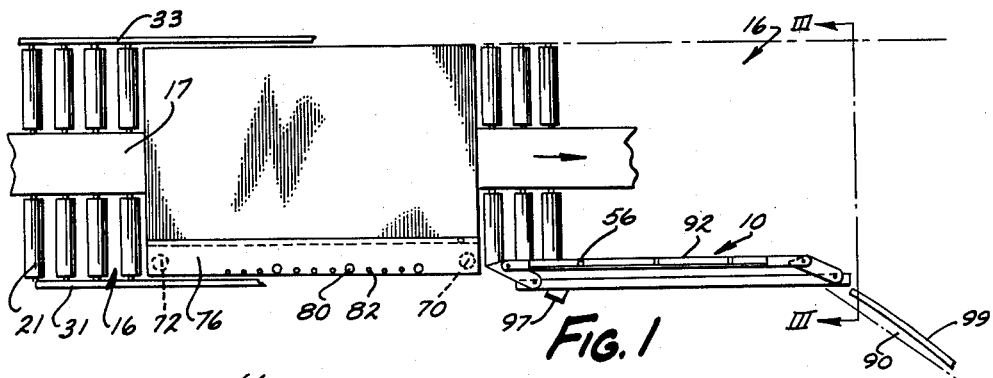
FIG. 1 is a plan view of one form of the inventive selector and diverter mechanism with an approaching carrier on a conveyor.
Figure 2:
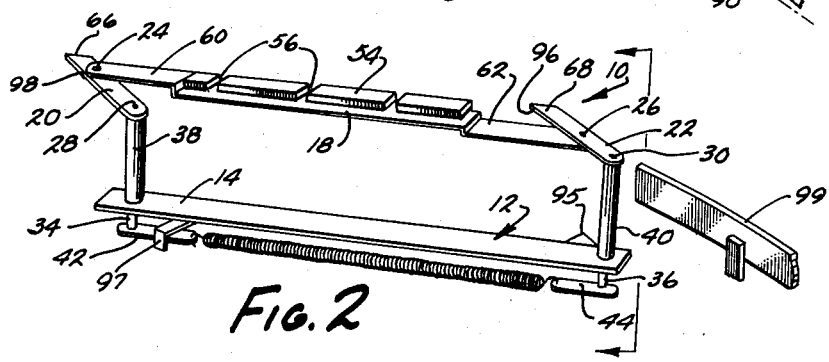
FIG. 2 is a perspective view of the selector and diverter mechanism illustrated in FIG. 1.
Figure 3:
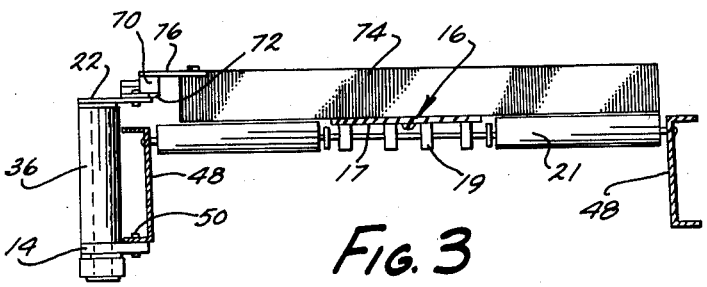
FIG. 3 is a sectional view taken on plane III—III of FIG. 1.

Basically, the invention comprises a selection and diverting apparatus for carriers on conveyors. The pre-set code message of each passing carrier associates with the reading means on the mechanical selection member of the device, and upon the formation of a key combination or interengagement between the preset code of a particular carrier and the selection member, a reaction occurs in the selection apparatus. The selection apparatus shifts laterally under a force created by the forward motion of the carrier to move across part of the carrier path. As it does so, it causes the carrier to be intercepted and guided off the conveyor. The intercepting apparatus forms a diverting means for coaction with corresponding follower means on the carrier. The selector member preferably constitutes one leg of a pantograph resembling four-bar linkage having four legs in the form of a parallelogram. The reading and selection operation is by association of spaced slots with spaced projections. The code is determined by the number of projections and their spacing. The slots preferably are located on the selector member and are formed to permit complementary code projections on a particular passing carrier to pass therethrough. This permits the selector apparatus to be extended under a biasing force to move across a portion of the carrier path and guide the carrier laterally from the conveyor.

Referring now to the drawings, in the form of the invention illustrated in FIGS. 1 through 6, the combination diverting and selection apparatus 10 comprises a pantograph 12 including one leg 14 affixable to or adjacent conveyor 16, and a second leg 18 parallel to leg 14. The legs 14 and 18 are joined by a pair of intermediate legs or links 20 and 22 pivotally secured to leg 18 at points 24 and 26 and to leg 14 at points 28 and 30. The leg 18 is a selector member. The pivotal connections at 28 and 30 includes a pair of rotatable shafts 34 and 36 (FIG. 3) extending through collars 38 and 40, which are atop to leg 14 of the parallelogram linkage. Leg 14 may be removably secured to a side rail 43 (FIG. 3) of the conveyor 16 by suitable bolts 50. Affixed to the bottom ends of shafts 34 and 36 are a pair of spring supports 42 and 44 extending toward each other when the pantograph is in equilibrium. Extending between the supports is a coil tension spring 26. Rotation of shafts 34 and 36 in either direction causes spring 46 to be extended against its biasing force due to angular rotation of supports 42 and 44 away from each other. Stops 95 and 97 normally limit clockwise rotation of spring supports 42 and 44, and thus limits rotation of shafts 34 and 36. This in turn limits the extension of leg 18 when interengaged with a carrier during operation in a manner to be described hereinafter. The spring tends to return the leg 18 to an intermediate position when depressed by a passing carrier or when pulled into an extended position by an interengaged carrier.

Suitable side rails 31 and 33 maintain alignment between the lead and follower camming pins 70 and 72 and the reader bar leg 18.

Leg or selector member 18 has a central section 54 having a series of spaced reading slots 56. The forward end 60 of the selector member 18 is offset upwardly to permit it to slide over and mount to link 20. The rearward end 62 is offset downwardly to permit the guide pin 70 to pass over it in a manner to be described hereinafter. End 62 is mounted beneath and to line 22. Links 20 and 22 possess outer camming surfaces 66 and 68, respectively, which are positioned generally diagonally with respect to conveyor 16 to coact with camming pins 70 and 72 in a manner to be described. The selector and diverting mechanism 10 coacts with carriers such as carrier 74 transported on conveyor 16. The conveyor may include belt 17, wheels 19, and rollers 21 mounted between lateral side supports 48, or other conventional structures, power or gravity.

Each carrier may possess a side flange 76 removably secured to the carrier by suitable bolts 78 or the like. The side flange supports the downwardly depending lead cam or guide pin 70 and follower cam or guide pin 72, and also the downwardly extending message code pins 80. The code pins 80 may be removably secured in openings 82 to match selected code reading slots 56 in a particular selector and diverter device mounted at a desired position along the conveyor. To supplement the diverting action of the selector device, any suitable auxiliary guide may be utilized. An illustrative guide 99 is shown adjacent branch conveyor 90 to help divert a selected carrier in a manner to be described.

Figure 4:
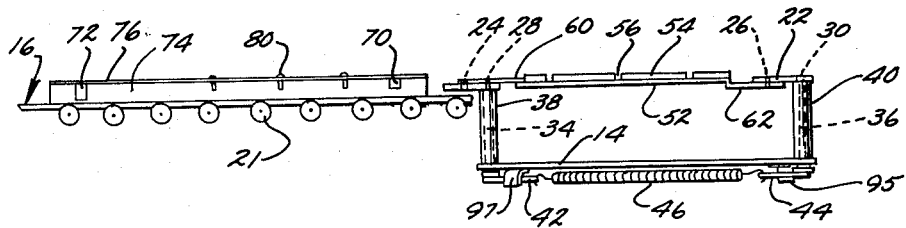
FIG. 4 is an elevational view of the apparatus illustrated in FIG. 1.

It will be noted from FIG. 4 that front guide pin 70 is shorter than rear pin 72. The lower surface of pin 70 is slightly above the upper surface of portion 62 of leg 18 to enable the pin to pass thereover when desired. Rear pin 72 is lower than portion 62 to hold the leg 18 depressed away from the conveyor when passing by as explained hereinafter. The camming pins 70 and 72 are also substantially larger in diameter than reading slots 56 to prevent catching of the former in the latter.

*Operation*

When desiring to transport article carriers on the conveyor and divert particular carriers at selected points along the conveyor unto a branch conveyor 90, a work table, or the like each individual carrier is provided with a side flange 76 having depending camming pins 70 and 72 thereon. Code pins 80 are placed in the appropriate selected openings 82 to match slots 56 of a particular selector.

As the lead cam pin 70 on a moving carrier contacts surface 66 of link 20 of the selector, it depresses link 20, and simultaneously link 22 and selector member 18 are depressed away from the conveyor and toward fixed leg 14 as depicted in FIG. 5. Pin 70 then rides along outer surface 92 of the selector member to hold it depressed. When pin 70 reaches the rearward end of the selector member adjacent leg 22, the front edge 92 of the selector member is permitted to contact the code pins 80. If the pins do not match the slots 56, they do not interengage and the follower cam pin 72 then contacts surface 92 to again depress the reading means away from the code pins. This allows only one reading per carrier and prevents jamming of individual code pins in the slots. Since the lower surface of pin 72 is below that of the upper surface of the offset trailing end 62, leg 18 is maintained in depressed position until the carrier has completely passed. It then returns to equilibrium position to read the next carrier. When the reader bar 18 is depressed by the carrier, pins 34 and 36 rotate counterclockwise to rotate spring supports 42 and 44 counterclockwise away from each other. Thereby spring 46 is extended and tends to bias the pantograph back to the equilibrium position.

If, on the other hand, code pins 80 correspond with slots 56, the selector member 18 is shifted outwardly from its equilibrium position by engagement of moving pins 80 in slots 56. In doing so, the code pins 80 pass clear through slots 56. This causes the outer ends of links 20 and 22 to intercept the path of camming pins 70 and 72 respectively. When pins 70 and 72 are intercepted, they ride along the back surfaces 96 and 98 of links 22 and 20 as depicted by the phantom pins in FIG. 6. The front pin 70 then catches behind auxiliary diverting flange 99. The rear pin 72 passes along behind leg 18 and above fixed leg 14 until it too follows flange 99 whereupon the carrier is completely diverted down branch conveyor 90. The outward extension of the linkage, caused by the force of the moving carrier against the backsides 96 and 98 of legs 22 and 20 is against the bias of spring 46. Further this extension is limited by the set of stops 95 and 97, which the spring supports 44 and 42 abut in their clockwise movement. After the carrier is dragged or shifted laterally so that pins 70 and 72 no longer abut legs 22 and 20, spring 46 returns the pantograph to its reading (equilibrium) position so it can associate with the next carrier. Obviously, all of these movements occur rapidly to thereby enable accommodation not only of heavy carrier loads, but also of many of them. It is to be understood that the sweeping or diverting action can be varied to shift the carrier a small amount or a large amount or to completely remove it from the conveyor. This will vary according to the size of the selector-diverter device, the type and width of the conveyor, the size and weight of the carrier, and the amount of lateral shifting desired. Various types of auxiliary diverting guides or other shifting means than a flange guide may be used to supplement the shifting action of the unique device discolsed.

It will be readily observed that the term "code" when used in this context designates a plurality of prearranged elements capable of "matching" or not matching a series of cooperative prearranged means on the "reader and selection bar," and therefore are given the designation "message code." Accordingly, the "reading" function is a physical association between the bar and the "code means," such that, if the cooperative sets of "code pins" and "code reading slots" match each other, "selection" can occur.

Modification

The inventive apparatus just described may be modified to alleviate some of the stress placed upon the short connecting links 20 and 22 by the shifting carrier. This is done by providing auxiliary fixed diverting guides directly on the selector device.

Referring to FIG. 7, the selecting and diverting device comprises a fixed leg or support 110 laterally and longitudinally movable selector member 112, connecting legs 114 and 116, and support 110. Leg 110 may be suitably secured to the conveyor as illustrated e.g. with the apparatus in FIG. 3. The leg 114 includes a front raised end in alignment with the carrier camming pins, and a rear lowered portion 115. End 115 is lowered to enable guide 118 affixed to base 110 at 113 and 119 to be coplanar with the outer upper end of leg 114. Likewise, rear portion 117 of leg 116 is lowered to allow fixed guide 120 secured to base 110 by flange 122 to be coplanar with the end of leg 116. Legs 114 and 116 are pivotally secured to the fixed leg and reader member at points 123, 125, 127 and 129.

Spring supports 152 and 154 are secured to the lower ends, respectively, of pivotal pins 155 and 157, as with the first embodiment, and have a spring 150 extending therebetween. These supports and the spring function like spring 46 of the apparatus illustrated in FIG. 2.

Selection of carriers is again made through the reading means comprising spaced slots 124 on upwardly extending flange 122. The slots associate with spaced code pins 126 on code support 128 of carrier 130. Camming pins 132 and 140 extend below the bottom edge of slots 124, thereby preventing undesirable interengagement therewith.

It will be noted that lead pin 132 is shorter than follower pin 140 to allow pin 132 to pass over link 114 without engaging it. This enables pin 132 to initially contact diagonal portion 134 of flange 122. Pin 132 is also short enough to pass through opening 142 adjacent leg 116 when a matching of code pins and reader slots occurs. It will be noted that the modified apparatus is very similar to that shown in FIGS. 1 through 6 except that the rear portions 115 and 117 of legs 114 and 116 have been lowered and auxiliary diverters 118 and 120 have been attached to aid legs 114 and 116 in the carrier diversion.

In operation, the lead camming pin 132 on an approaching carrier 130 passes over leg 114 and contacts the diagonal end or camming surface 134 of flange 122 to depress leg 112 of the pantograph (FIG. 9) against the biasing force of spring 150. Pin 132 then rides along the outer surface of the reading flange 122 and holds it depressed until the pin reaches the far end of the selector member. As the pin passes the far end of flange 122 and coincides with opening 142, the selector member is released momentarily to move toward the carrier under the influence of spring 150. This causes an association between the code pins 126 and the reading slots 124 for a short time interval. If the pins and slots do not match, i.e. are not complementary, the carrier continues along the main conveyor and the follower pin 140 contacts flange surface 134 to again depress and hold the reader means away from the code pins 126. This single reading prevents any jamming of individual code pins with the reading slots. Follower pin 140 is longer than pin 132 so that it will not catch in opening 142 (adjacent leg 116) as it passes, but will instead hold the member depressed until the carrier has completely passed.

If a matching of the pins and slots occurs, i.e. form a key combination, the depressed selector member 112 is allowed to extend toward the conveyor to its normal position. This extension causes the code pins 126 to pass through the slots 124. The legs 114 and 116 simultaneously extend to intercept the paths of camming pins 140 and 132, respectively, which pins ride down the back surfaces of the legs a short distance. Pin 140 then rides along the edge and then the back surface of guide 118, while pin 132 rides along flange 120, as shown by the phantom pins in FIG. 7. Both pins then pass behind a suitable supplemental flange guide 133 as desired.

It will be readily apparent that the geometrical configuration of the code and code reading means may be varied widely as well as that of the sweep-off mechanism, all within the confines of the combination selector-diverter concept.

The coded carriers used in combination with the selector and diverter device may be of any desired type such as flat pallets, tote boxes, buckets, trays, simple message carriers, production articles placed on the conveyor and capable of receiving a code, or any other of many possible carrier structures. The term "carrier" is thus intended to include such varied forms of devices.

It will be seen that by changing the spacing of the respective pins or slots, the carrier may be made to pass several or even several dozen selection devices before meeting the matching one which will cause its removal from the conveyor. Variable slot spacing may be obtained by sliding a suitable plate or guard over particular slots while allowing others to remain uncovered for coaction with a set code of pins of prearranged pattern. The code pins may be varied by moving the pins into various openings provided in the carrier or may be merely raised or lowered into the desired position, using suitable spring detents or the like. Not only may the position of the pins be varied, but the number may also be varied to produce a wide variety of possible code combinations. It is also conceivable that the pins may be placed upon the selector member with the slots being located in a side surface of the attached code bearing carrier in certain instances.

It will be recognized that the illustrated structure presenting the inventive concept may be modified in various ways depending upon the particular materials to be conveyed, the type of conveyor, the type of carrier and many other factors. Thus, the scope of this inventive concept is not to be limited to the illustrative material disclosed but only by the scope of the appended claims and the reasonable equivalents thereto.

We claim:

1. A selection and diverting device for a conveyor to transport article carriers, comprising: a four-bar linkage having four legs arranged in a parallelogram; one leg of said linkage fixedly mountable with respect to said conveyor; the leg opposite said fixed leg comprising a selector member; a pair of parallel legs connecting said selector member and said fixed leg to allow lateral and longitudinal movement of said selector member with respect to said fixed leg and to said conveyor; said selector member being normally biased toward said conveyor; spaced reader slots on said selector member and spaced code pins on passing carriers; a fixed follower cam on the rear of each of said carriers; a fixed projecting lead cam on the front of each of said carriers to normally depress said selector member against said bias and allow said slots to associate with said pins for a brief limited period; said selector member being movable toward said conveyor and toward the carrier thereon by said bias upon the occurrence of a match between said pins of a particular carrier and said slotes to thereby cause said slots to pass by said pins; said pair of parallel legs intercepting the path of said fixed lead cam and follower cam with the occurrence of said match and biased movement and having diagonal surfaces engageable with said cams to comprise diverting leadoff means to divert said particular carrier; and stop means to limit extension of said linkage under the force of the diverting carrier.

2. A selection and diverting device for a conveyor supporting carriers comprising: a four-bar linkage having four legs arranged in a parallelogram; one leg of said linkage fixedly mountable with respect to said conveyor; the leg opposite said fixed leg comprising a selector member; a pair of parallel legs connecting said selector member and said fixed leg to allow lateral and longitudinal movement of said selector member with respect to said fixed leg and to said conveyor; spaced reader slots on said selector member and spaced pre-set code pins on passing carriers; fixed fore and aft projecting camming elements on each of said carriers; biasing means connected to said linkage and biasing said selector member toward said conveyor; said pair of parallel legs having diagonal camming surfaces in the path of said fore and aft elements when said linkage is so biased; engagement of said elements and camming surfaces causing depression of said selector member against said bias to allow only momentary physical association between said slots and said pins as said carrier is alongside said selector member; said selector member being movable toward said conveyor and the carrier thereon by said bias upon the occurrence of a match between said pins of a particular carrier and said slots causing said slots to pass said pins; engagement of said slots with said pins causing extension of said selector member over said conveyor further than its normal position as said slots pass through said pins; said pair of parallel legs having diagonal backside diverting surfaces; the outer ends of said backside surfaces being extended to intercept the path of said fore and aft elements upon the further extension of said linkage for engagement therewith; and stop means operably associated with said linkage and activated with said further extension to hold said diverting surfaces rigid for carrier diverting.

References Cited in the file of this patent

UNITED STATES PATENTS

| | | |
|---|---|---|
| 1,503,936 | Benoit | Aug. 5, 1924 |
| 1,804,154 | Cowley et al. | May 5, 1931 |
| 2,253,572 | Mitchell | Aug. 26, 1941 |
| 2,931,484 | Muller et al. | Apr. 5, 1960 |